(12) United States Patent
Rook

(10) Patent No.: US 9,670,975 B1
(45) Date of Patent: Jun. 6, 2017

(54) TORQUE TUBE DAMPING DEVICES AND ASSEMBLIES

(71) Applicant: Goodrich Corporation, Charlotte, NC (US)

(72) Inventor: Todd Rook, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 7 days.

(21) Appl. No.: 14/976,744

(22) Filed: Dec. 21, 2015

(51) Int. Cl.
| F16D 65/00 | (2006.01) |
| B64C 25/42 | (2006.01) |
| B64C 25/58 | (2006.01) |
| F16D 55/36 | (2006.01) |

(52) U.S. Cl.
CPC .......... *F16D 65/0006* (2013.01); *B64C 25/42* (2013.01); *B64C 25/58* (2013.01); *F16D 55/36* (2013.01)

(58) Field of Classification Search
CPC .......... F16D 55/24; F16D 55/36; F16D 55/38; F16D 55/40; F16D 65/0006; F16D 65/0018

See application file for complete search history.

(56) References Cited

U.S. PATENT DOCUMENTS

| 3,357,519 A | * | 12/1967 | Black | B64C 25/42 188/18 A |
| 3,368,653 A | * | 2/1968 | Vander | B64C 25/42 188/218 A |
| 5,310,025 A | | 5/1994 | Anderson | |
| 5,323,881 A | * | 6/1994 | Machan et al. | F16D 55/36 188/18 A |
| 5,915,503 A | * | 6/1999 | Enright | F16D 55/36 188/130 |
| 6,241,062 B1 | * | 6/2001 | Enright | F16F 7/00 188/18 A |
| 6,631,793 B2 | * | 10/2003 | Evrard | F16D 65/095 188/71.1 |
| 8,562,242 B2 | | 10/2013 | Murgatroyd et al. | |
| 2014/0221110 A1 | | 8/2014 | Shippy et al. | |

OTHER PUBLICATIONS

Bibliographic data for GB application No. 1508021.1 filed May 11, 2015 entitled "Fibre reinforced polymer matrix composite torque tubes or shafts." Retrieved from https://www.ipo.gov.uk/p-ipsum/Case/ApplicationNumber/GB1508021.1.

* cited by examiner

Primary Examiner — Thomas J Williams
(74) Attorney, Agent, or Firm — Snell & Wilmer L.L.P.

(57) ABSTRACT

The present disclosure provides a torque tube comprising a barrel portion disposed between a flange and a back leg, the flange extending radially inward towards an axis of rotation and the back leg extending radially outward from the barrel portion. The torque tube further comprises a channel defined by a channel wall and disposed in at least one of the barrel portion and the flange, the channel being configured to receive a sacrificial member.

19 Claims, 5 Drawing Sheets

TORQUE TUBE DAMPING DEVICES AND ASSEMBLIES

FIELD OF THE DISCLOSURE

The present disclosure relates to torque tubes and torque tube assemblies, and more particularly, to vibration damping aircraft brake torque tubes and torque tube assemblies.

BACKGROUND OF THE DISCLOSURE

Aircraft brake systems typically employ a series of rotors and stators that, when forced into contact with each other, help to stop the aircraft. Stators splined to a non-rotating torque tube are interspersed with rotors splined to the rotating wheel. Compression of the rotating rotors against the stationary stators causes torque to react through the stators to the torque tube, causing twisting and vibration of the torque tube.

SUMMARY OF THE DISCLOSURE

In various embodiments, the present disclosure provides a torque tube comprising a barrel portion disposed between a flange and a back leg, the flange extending radially inward towards an axis of rotation and the back leg extending radially outward from the barrel portion. In various embodiments, the torque tube further comprises a first spline disposed on an outer diameter of the barrel portion, a second spline disposed on an outer diameter of the barrel portion and substantially parallel to the first spline, and a channel defined by a channel wall and disposed in at least one of the barrel portion and the flange, the channel being configured to receive a sacrificial member.

In various embodiments, the torque tube may further comprise a torque tube foot disposed on an inner diameter of the barrel portion, the torque tube foot comprising at least one of a groove or an aperture configured to receive a sacrificial member. In various embodiments, the channel wall may comprise an obtuse-angled edge. In various embodiments, the channel wall may comprise an acute-angled edge. In various embodiments, the channel may be disposed in an outer diameter of the barrel portion. In various embodiments, the channel may extend in an axial direction at least partially between the flange and the back leg. In various embodiments, the channel may extend in a radial direction at least partially between the first spline and the second spline.

In various embodiments, the present disclosure provides a torque tube assembly comprising a torque tube having a barrel portion disposed between a flange and a back leg, the flange extending radially inward towards an axis of rotation and the back leg extending radially outward from the barrel portion. In various embodiments, the torque tube assembly further comprises a sacrificial member disposed on at least one of the flange and a torque tube foot, the torque tube foot being disposed on an inner diameter of the barrel portion, wherein a friction face of the sacrificial member is in frictional contact with the inner diameter of the barrel portion.

In various embodiments, the sacrificial member may comprise a carbon composite material. In various embodiments, the torque tube assembly may further comprise a rivet configured to couple the sacrificial member to at least one of the flange and the torque tube foot. In various embodiments, the sacrificial member may be disposed on the flange and extends in an axial direction at least partially between the flange and the torque tube foot. In various embodiments, the torque tube assembly may further comprise a channel defined by a channel wall and disposed in the flange, wherein sacrificial member is at least partially disposed in the channel. In various embodiments, the channel wall may comprise an obtuse-angled edge. In various embodiments, the channel wall may comprise an acute-angled edge. In various embodiments, the sacrificial member may be disposed on the torque tube foot and extends in an axial direction at least partially between the torque tube foot and the flange.

In various embodiments, the present disclosure provides a torque tube assembly comprising a torque tube comprising a barrel portion disposed between a flange and a back leg, the back leg extending radially outward from the barrel portion, a first spline disposed on an outer diameter of the barrel portion, a second spline disposed on an outer diameter of the barrel portion and substantially parallel to the first spline, and a channel defined by a channel wall and disposed in an outer diameter of the barrel portion. In various embodiments, the torque tube assembly further comprises a sacrificial member disposed in the channel, wherein a friction face of the sacrificial member is in frictional contact with the channel.

In various embodiments, the channel wall may comprise an obtuse-angled edge. In various embodiments, the channel wall may comprise an acute-angled edge. In various embodiments, the channel may extend in an axial direction at least partially between the flange and the back leg. In various embodiments, the channel may extend in a radial direction at least partially between the first spline and the second spline.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft brake torque tubes. However, various aspects of the disclosed embodiments may be adapted for optimized performance with a variety of torque tubes and/or torque tube assemblies. As such, numerous applications of the present disclosure may be realized.

Figure 1:
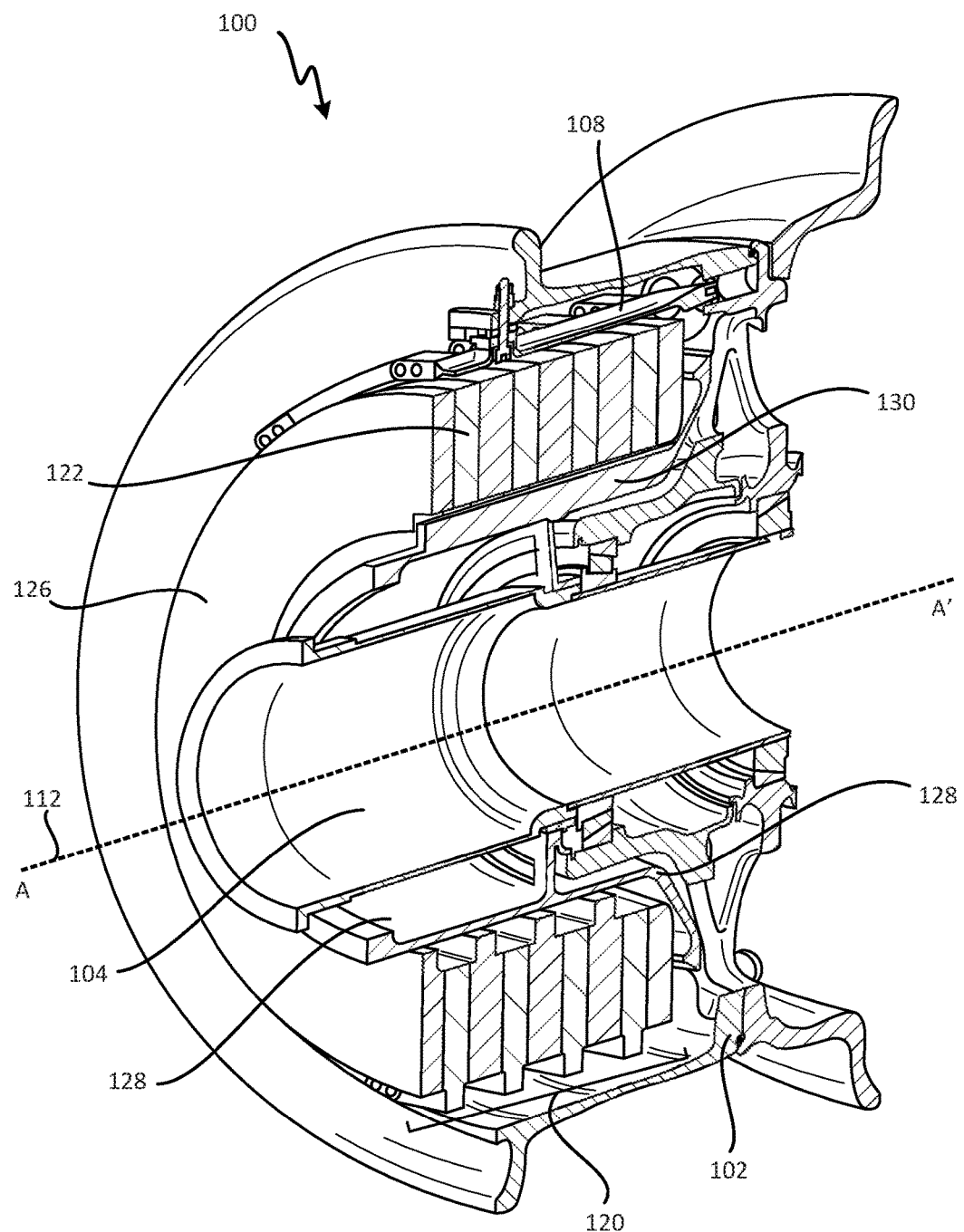
FIG. 1 illustrates a perspective view of portions of a wheel and brake assembly in accordance with various embodiments.

In accordance with various embodiments and with reference to FIG. 1, a wheel and brake assembly 100 may comprise a wheel 102 at least partially surrounding a brake assembly. In various embodiments, the brake assembly comprises a brake stack 120 oriented about axis of rotation 112. Brake stack 120 may comprise a plurality of alternating stators 126 and rotors 122. In various embodiments, the brake assembly may further comprise one or more torque bars 108 configured to engage with rotors 122 as wheel 102, torque bars 108, and rotors 122 rotate about axis of rotation 112.

In various embodiments, stators 126 may be stationary and may be coupled to torque tube 128. In various embodiments, torque tube 128 may be coupled to an axle sleeve and/or axle 104 via a bushing. In various embodiments, torque tube 128 may comprise at least one spline 130 on its outer diameter. In various embodiments, the at least one spline 130 may be configured to couple stators 126 to torque tube 128, thereby preventing rotation of stators 126. In various embodiments, compression of rotating rotors 122 against stationary stators 126 may cause torque to react through stators and into torque tube 128. FIG. 1 provides a general understanding of portions of a wheel and brake assembly, and is not intended to limit the disclosure.

Figure 2A:
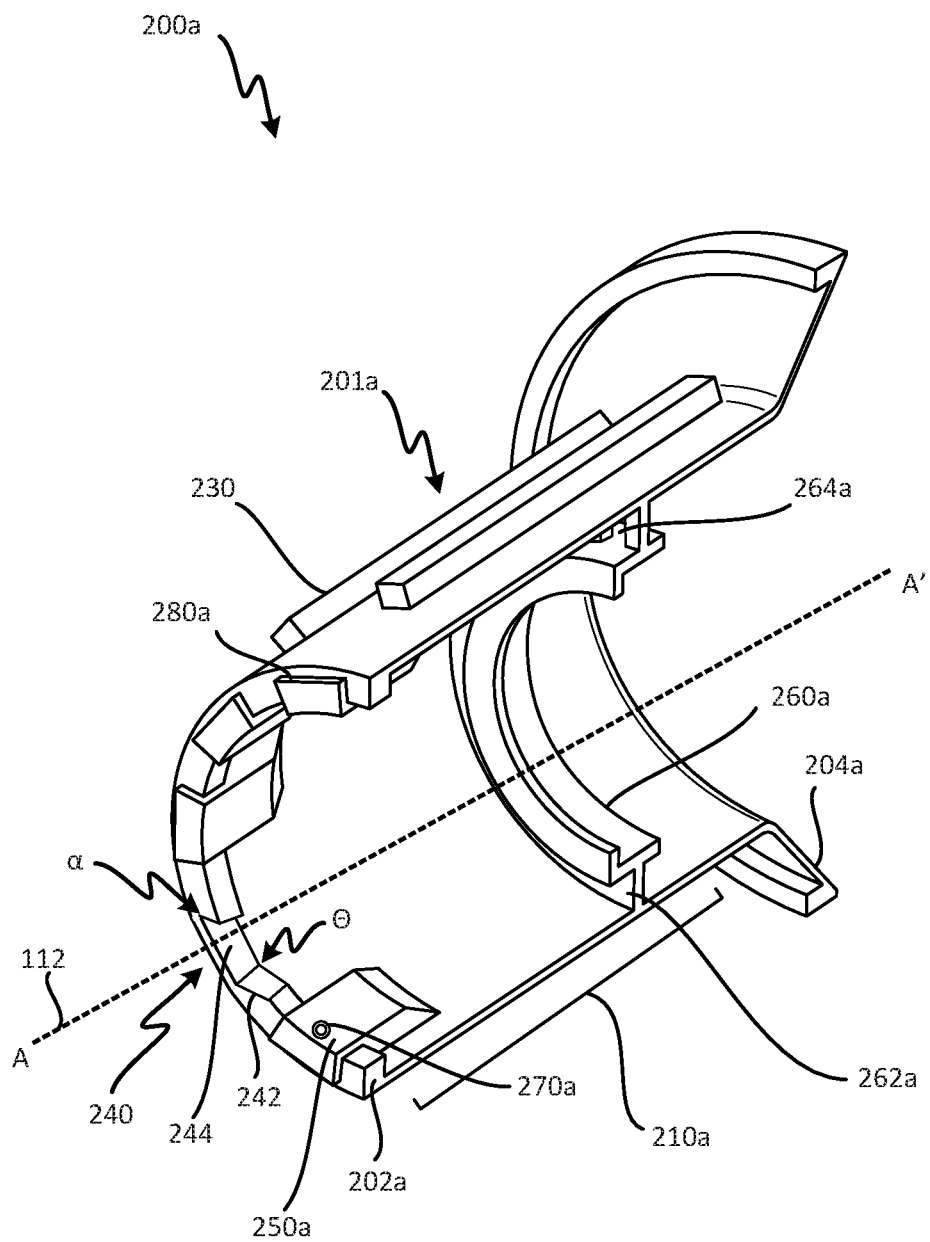
FIG. 2a illustrates a perspective cut-away view of a torque tube assembly in accordance with various embodiments.

In various embodiments, and with reference to FIG. 2a, a torque tube assembly 200a may comprise a torque tube 201a and a sacrificial member 250a. In various embodiments, torque tube 201a may be oriented about an axis of rotation 112. In various embodiments, the torque tube 201a may comprise a barrel portion 210a disposed between a flange 202a and a back leg 204a. In various embodiments, flange 202a may be disposed on a first axial end of torque tube 201a and may extend radially inward from barrel portion 210a towards axis of rotation 112. In various embodiments, back leg 204a may be disposed on a second axial end of torque tube 201a and extend radially outward from barrel portion 210a.

In various embodiments, torque tube 201a may further comprise at least one spline 230 disposed on an outer diameter of barrel portion 210a. In various embodiments, spline 230 may extend axially along the outer diameter of barrel portion 210a at least partially between flange 202a and back leg 204a. In various embodiments, torque tube 201a may comprise a plurality of splines disposed radially about the outer diameter of barrel portion 210a. In various embodiments, each spline 230 of the plurality of splines may be disposed substantially parallel to the others.

In various embodiments, torque tube 201a may comprise a torque tube foot 260a configured to couple torque tube 201a to wheel axle 104 (with momentary reference to FIG. 1). In various embodiments, torque tube foot 260a may be disposed on, and extending circumferentially about, an inner diameter of barrel portion 210a. In various embodiments, torque tube foot 260a may be disposed axially between flange 202a and back leg 204a. In various embodiments, torque tube foot 260a may extend radially inward from barrel portion 210a. In various embodiments, torque tube foot 260a and barrel portion 210a may be disposed relative to one another so as to define a circumferential groove 262a therebetween. In various embodiments, circumferential groove 262a may be configured to receive a sacrificial member 250a. In various embodiments, torque tube foot 260a may comprise at least one aperture 264a extending axially from a first axial end of torque tube foot 260a to a second axial end of torque tube foot 260a. In various embodiments, aperture 264a may be configured to receive a sacrificial member 250a.

In various embodiments, torque tube 201a may further comprise a channel 240. In various embodiments, channel 240 may comprise a slot, channel, depression, or the like and may be configured to receive a sacrificial member 250a (described below). In various embodiments, channel 240 may be disposed in flange 202a. In various embodiments, channel 240 may be disposed in an inner diameter of barrel portion 210a.

In various embodiments, channel 240 may be defined by channel wall 242 and/or a channel base 244. In various embodiments, channel wall 242 may define a depth of channel 240 extending radially outward into a surface of flange 202a and/or the inner diameter of barrel portion 210a. In various embodiments, channel wall 242 may define a profile or shape of channel 240. In various embodiments, channel wall 242 and channel base 244 may define a profile or shape of channel 240. In various embodiments, channel 240 may comprise a rectangular, prismatic, cylindrical, elliptical, or pyramidal shape. However, in various embodiments, channel 240 may comprise any shape suitable for use in torque tube 201a.

In various embodiments, channel wall 242 and channel base 244 may be disposed perpendicular to one another. In various embodiments, channel wall 242 and channel base 244 may be disposed relative to one another such that an obtuse angle theta ($\theta$) is disposed therebetween. Stated differently, in various embodiments, channel 240 may comprise at least one obtuse-angled edge. In various embodiments, channel 240 may be configured such that a sacrificial member 250a is not restricted from inward radial movement by any portion of torque tube 201a.

In various embodiments, channel wall 242 and channel base 244 may be disposed relative to one another such that an acute angle alpha ($\alpha$) is disposed therebetween. Stated differently, in various embodiments, channel 240 may comprise at least one acute-angled edge. In various embodiments, channel 240 may be dove-tailed such that the acute-angled edge limits or restricts inward radial movement of sacrificial member 250a.

In various embodiments, channel 240 may be configured to receive sacrificial member 250a. In various embodiments, sacrificial member 250a may be configured to be in frictional contact with portions of torque tube 201a so as to damp vibration of torque tube 201a. In various embodiments, the vibration may comprise squeal vibration, or torsional motion of the non-rotating brake parts about the axle. In various embodiments, the vibration may comprise whirl mode vibration, or a wobble outside the rotational plane between torque tube 201a and back leg 204a. In various embodiments, relative motion of torque tube 201a and sacrificial member 250a dissipates, and thereby damps, the vibration. In various embodiments, relative motion of torque tube 201*a* and sacrificial member 250*a* causes wear and/or degradation of sacrificial member 250*a* but does not cause wear, degradation, and/or damage to torque tube 201*a*.

In various embodiments, sacrificial member 250*a* may comprise a carbon composite material. In various embodiments, sacrificial member 250*a* may comprise carbon fiber-reinforced carbon, a composite material consisting of carbon fiber reinforced by a matrix of graphite. However, in various embodiments, sacrificial member 250*a* may comprise any material suitable for damping vibration of torque tube 201*a*.

In various embodiments, sacrificial member 250*a* may be disposed in channel 240. In various embodiments, sacrificial member 250*a* may comprise a shape complimentary to channel 240. In various embodiments, sacrificial member 250*a* may be disposed and/or friction fit in channel 240. In various embodiments, sacrificial member 250*a* may be coupled to at least one of channel 240 or flange 202*a* by at least one of a rivet 270*a*, bolt, clamp, or other mechanical fastener. In various embodiments, sacrificial member 250*a* may extend from flange 202*a* in an axial direction, partially towards torque tube foot 260*a*. In various embodiments, sacrificial member 250*a* may extend between, and be disposed at least partially in both channel 240 and circumferential groove 262*a*.

Figure 2B:
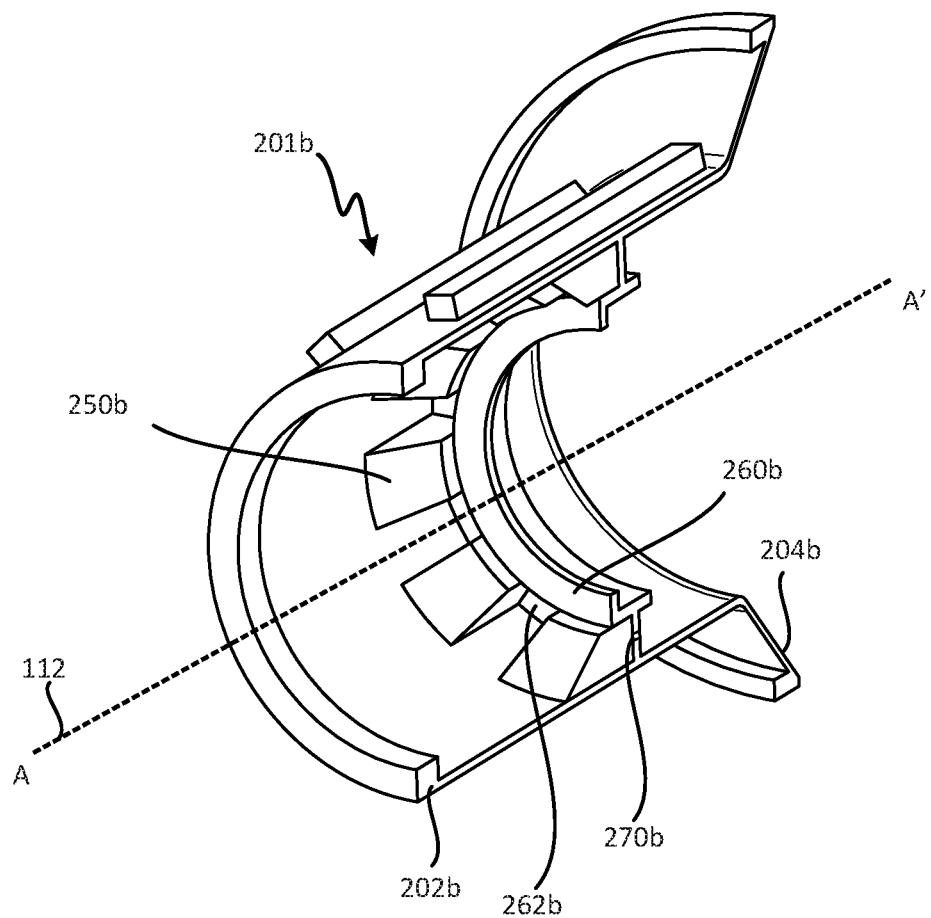
FIG. 2b illustrates a perspective cut-away view of a torque tube assembly in accordance with various embodiments.

In various embodiments and with reference to FIG. 2*b*, sacrificial member 250*b* may be disposed in circumferential groove 262*b*. In various embodiments, sacrificial member 250*b* may comprise a shape complimentary to circumferential groove 262*b*. In various embodiments, sacrificial member 250*b* may be disposed and/or friction fit in circumferential groove 262*b*. In various embodiments, sacrificial member 250*b* may be coupled to at least one of circumferential groove 262*b* or torque tube foot 260*b* by at least one of a rivet 270*b*, bolt, clamp, or other mechanical fastener. In various embodiments, sacrificial member 250*b* may extend from torque tube foot 260*b* in an axial direction at least partially towards flange 202*b*.

In various embodiments, sacrificial member 250*b* may be configured to be in frictional contact with portions of torque tube 201*b* so as to damp vibration of torque tube 201*b*. In various embodiments, the vibration may comprise squeal vibration, or torsional motion of the non-rotating brake parts about the axle. In various embodiments, the vibration may comprise whirl mode vibration, or a wobble outside the rotational plane between torque tube 201*b* and back leg 204*b*. In various embodiments, relative motion of torque tube 201*b* and sacrificial member 250*b* dissipates, and thereby damps, the vibration. In various embodiments, relative motion of torque tube 201*b* and sacrificial member 250*b* causes wear and/or degradation of sacrificial member 250*b* but does not cause wear, degradation, and/or damage to torque tube 201*b*.

In various embodiments, sacrificial member 250*b* may comprise a carbon composite material. In various embodiments, sacrificial member 250*b* may comprise carbon fiber-reinforced carbon, a composite material consisting of carbon fiber reinforced by a matrix of graphite. However, in various embodiments, sacrificial member 250*b* may comprise any material suitable for damping vibration of torque tube 201*b*.

Figure 2C:
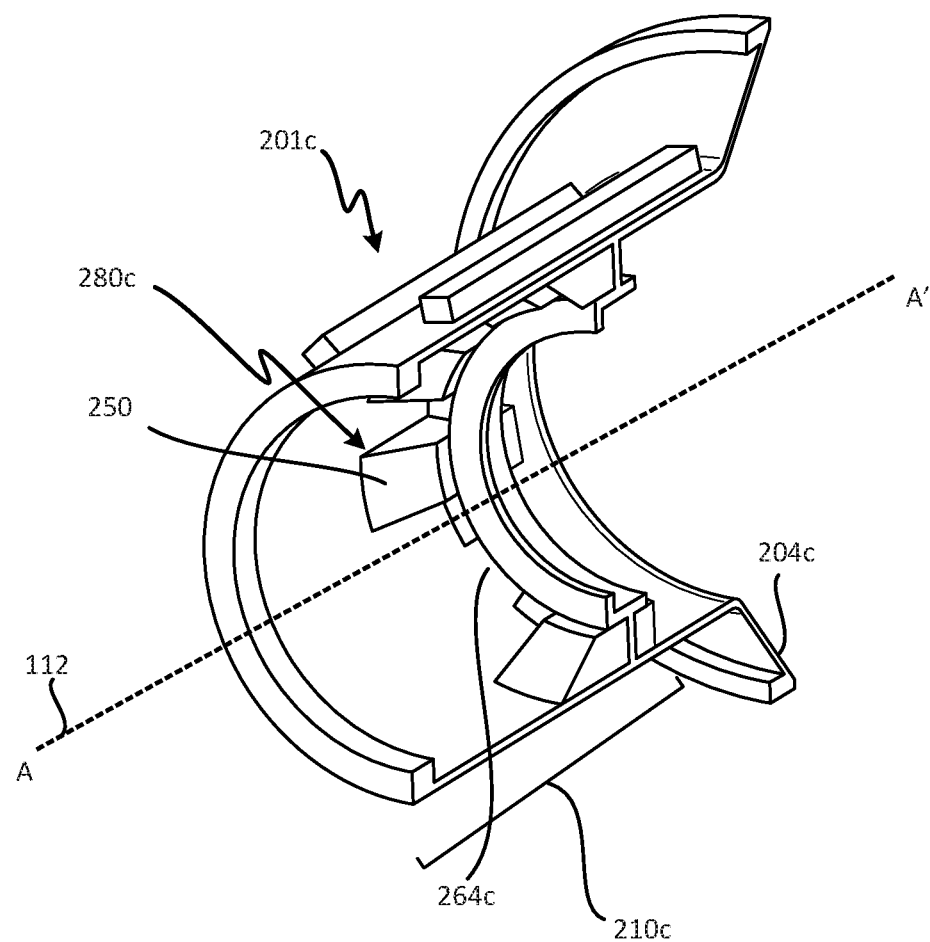
FIG. 2c illustrates a perspective cut-away view of a torque tube assembly in accordance with various embodiments.

In various embodiments and with reference to FIGS. 2*a* and 2*c*, sacrificial member 250*a*, 250*c* may be disposed at least partially in aperture 264. In various embodiments, sacrificial member 250*a*, 250*c* may comprise a shape complimentary to aperture 264*a*, 264*c*. In various embodiments, sacrificial member 250*a*, 250*c* may be floated and/or friction fit in aperture 264*a*, 264*c*. In various embodiments, sacrificial member 250*a*, 250*c* may extend through aperture 264*a*, 164*c* in an axial direction at least partially towards back leg 204*a*, 204*c*.

In various embodiments, sacrificial member 250*a*, 250*c* may comprise a friction face 280*a*, 280*c* disposed on a portion of sacrificial member 250*a*, 250*c* in frictional contact with the inner diameter of barrel portion 210*a*, 210*c*. In various embodiments, friction face 280*a*, 280*c* may be configured to damp vibration of torque tube 201*a*, 210*c* through interfacial friction between friction face 280*a*, 280*c* and the inner diameter of barrel portion 210*a*, 210*c*. In various embodiments, friction face 280*a*, 280*c* may comprise a shape complimentary to the inner diameter of barrel portion 210*a*, 210*c*. In various embodiments, friction face 280*a*, 280*c* may comprise a radius of curvature substantially equal to a radius of curvature of the inner diameter.

In various embodiments, sacrificial member 250*c* may be configured to be in frictional contact with portions of torque tube 201*c* so as to damp vibration of torque tube 201*c*. In various embodiments, the vibration may comprise squeal vibration, or torsional motion of the non-rotating brake parts about the axle. In various embodiments, the vibration may comprise whirl mode vibration, or a wobble outside the rotational plane between torque tube 201*c* and back leg 204*c*. In various embodiments, relative motion of torque tube 201*c* and sacrificial member 250*c* dissipates, and thereby damps, the vibration. In various embodiments, relative motion of torque tube 201*c* and sacrificial member 250*c* causes wear and/or degradation of sacrificial member 250*c* but does not cause wear, degradation, and/or damage to torque tube 201*c*.

In various embodiments, sacrificial member 250*c* may comprise a carbon composite material. In various embodiments, sacrificial member 250*c* may comprise carbon fiber-reinforced carbon, a composite material consisting of carbon fiber reinforced by a matrix of graphite. However, in various embodiments, sacrificial member 250*c* may comprise any material suitable for damping vibration of torque tube 201*c*.

Figure 3:
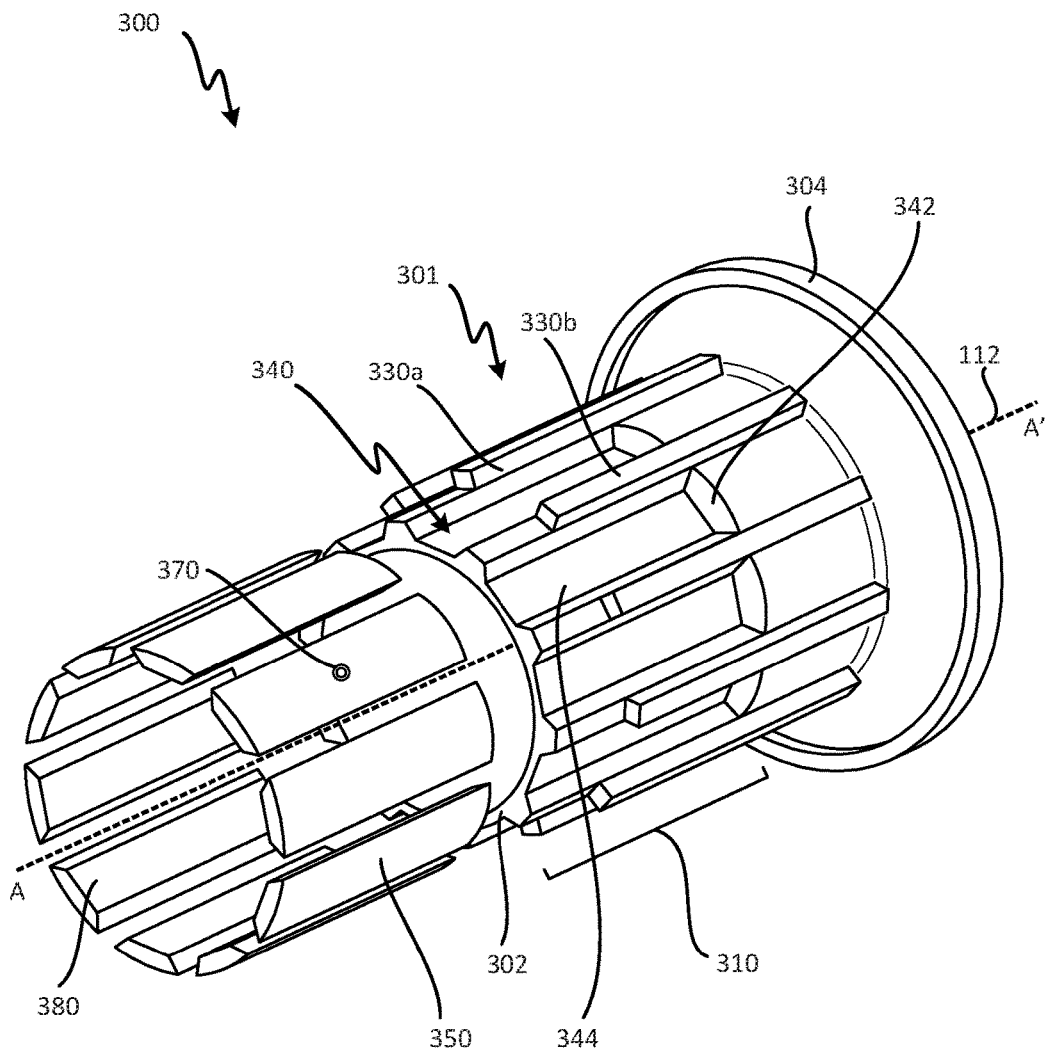
FIG. 3 illustrates an exploded perspective view of a torque tube assembly in accordance with various embodiments.

In various embodiments and with reference to FIG. 3, a torque tube assembly 300 may comprise a torque tube 301 and a sacrificial member 350. In various embodiments, torque tube 301 may be oriented about an axis of rotation 112. In various embodiments, the torque tube 301 may comprise a barrel portion 310 disposed between a flange 302 and a back leg 304. In various embodiments, flange 302 may be disposed on a first axial end of torque tube 301 and may extend radially inward from barrel portion 310 towards axis of rotation 112. In various embodiments, back leg 304 may be disposed on a second axial end of torque tube 301 and extend radially outward from barrel portion 310.

In various embodiments, torque tube 301 may further comprise at least one spline 330*a*, 330*b* disposed on an outer diameter of barrel portion 310. In various embodiments, spline 330*a*, 330*b* may extend axially along the outer diameter of barrel portion 310 at least partially between flange 302 and back leg 304. In various embodiments, torque tube 301 may comprise a plurality of splines disposed radially about the outer diameter of barrel portion 310. In various embodiments, each spline 330*a*, 330*b* of the plurality of splines may be disposed substantially parallel to the others.

In various embodiments, torque tube 301 may further comprise a channel 340. In various embodiments, channel 340 may comprise a slot, channel, depression, or the like and may be configured to receive a sacrificial member 350. In various embodiments, channel 340 may be disposed in an outer diameter of barrel portion 310.

In various embodiments, channel 340 may be defined by channel wall 342 and/or a channel base 344. In various embodiments, channel wall 342 may define a depth of channel 340 extending radially inward from the outer diameter of barrel portion 310. In various embodiments, channel wall 342 may define a profile or shape of channel 340. In various embodiments, channel wall 342 and channel base 344 may define a profile or shape of channel 340. In various embodiments, channel 340 may comprise a rectangular, prismatic, cylindrical, elliptical, or pyramidal shape. However, in various embodiments, channel 340 may comprise any shape suitable for use in torque tube 301.

In various embodiments, channel wall 342 and channel base 344 may be disposed perpendicular to one another. In various embodiments, channel wall 342 and channel base 344 may be disposed relative to one another such that an obtuse angle theta (θ) is disposed therebetween. Stated differently, in various embodiments, channel 340 may comprise at least one obtuse-angled edge. In various embodiments, channel 340 may be configured such that a sacrificial member 350 is not restricted from outward radial movement by any portion of torque tube 301.

In various embodiments, channel wall 342 and channel base 344 may be disposed relative to one another such that an acute angle alpha (α) is disposed therebetween. Stated differently, in various embodiments, channel 340 may comprise at least one acute-angled edge. In various embodiments, channel 340 may be dove-tailed such that the acute-angled edge limits or restricts outward radial movement of sacrificial member 350.

In various embodiments, channel 340 may extend from flange 302 in an axial direction partially towards torque tube foot back leg 304. In various embodiments, channel 340 may extend in an axial direction from the first axial end of torque tube 301 to the second axial end of torque tube 301. In various embodiments, channel 340 may extend in a radial direction from a first spline 330a partially towards a second spline 330b. In various embodiments, channel 340 may extend in a radial direction from the first spline 330a to the second spline 330b.

In various embodiments, channel 340 may be configured to receive sacrificial member 350. In various embodiments, sacrificial member 350 may be configured to be in frictional contact with portions of torque tube 301 so as to damp vibration of torque tube 301. In various embodiments, the vibration may comprise squeal vibration, or torsional motion of the non-rotating brake parts about the axle. In various embodiments, the vibration may comprise whirl mode vibration, or a wobble outside the rotational plane between torque tube 301 and back leg 304. In various embodiments, relative motion of torque tube 301 and sacrificial member 350 dissipates, and thereby damps, the vibration. In various embodiments, relative motion of torque tube 301 and sacrificial member 350 causes wear and/or degradation of sacrificial member 350 but does not cause wear, degradation, and/or damage to torque tube 301.

In various embodiments, sacrificial member 350 may comprise a carbon composite material. In various embodiments, sacrificial member 350 may comprise carbon fiber-reinforced carbon, a composite material consisting of carbon fiber reinforced by a matrix of graphite. However, in various embodiments, sacrificial member 350 may comprise any material suitable for damping vibration of torque tube 301.

In various embodiments, sacrificial member 350 may be disposed in channel 340. In various embodiments, sacrificial member 350 may comprise a shape complimentary to channel 340. In various embodiments, sacrificial member 350 may be floated and/or friction fit in channel 340. In various embodiments, sacrificial member 350 may be coupled to torque tube 301 by at least one of a rivet 370, bolt, clamp, or other mechanical fastener.

In various embodiments, sacrificial member 350 may comprise a friction face 380 disposed on a portion of sacrificial member 350 in frictional contact with channel 340. In various embodiments, friction face 380 may be configured to damp vibration of torque tube 301 through interfacial friction between friction face 380 and channel 340. In various embodiments, friction face 380 may comprise a shape complimentary to channel 340.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque tube comprising:
 a barrel portion disposed between a flange and a back leg, the flange extending radially inward towards an axis of rotation and the back leg extending radially outward from the barrel portion; and
 a channel defined by a channel wall and disposed in at least one of the barrel portion and the flange, the channel being configured to receive a sacrificial member; and
 a torque tube foot disposed on an inner diameter of the barrel portion, the torque tube foot comprising at least one of a groove or an aperture configured to receive the sacrificial member.

2. The torque tube of claim 1, wherein the channel wall comprises an obtuse-angled edge.

3. The torque tube of claim 1, wherein the channel wall comprises an acute-angled edge.

4. The torque tube of claim 1, wherein the channel is disposed in an outer diameter of the barrel portion.

5. The torque tube of claim 4, wherein the channel extends in an axial direction at least partially between the flange and the back leg.

6. The torque tube of claim 5, further comprising:
 a first spline disposed on the outer diameter of the barrel portion; and
 a second spline disposed on the outer diameter of the barrel portion and substantially parallel to the first spline, wherein the channel extends in a radial direction at least partially between the first spline and the second spline.

7. A torque tube assembly comprising:
 a torque tube having a barrel portion disposed between a flange and a back leg, the flange extending radially inward towards an axis of rotation and the back leg extending radially outward from the barrel portion; and
 a sacrificial member disposed on at least one of the flange and a torque tube foot, the torque tube foot being disposed on an inner diameter of the barrel portion, wherein a friction face of the sacrificial member is in frictional contact with the inner diameter of the barrel portion.

8. The torque tube assembly of claim 7, wherein the sacrificial member comprises a carbon composite material.

9. The torque tube assembly of claim 7, further comprising a rivet configured to couple the sacrificial member to at least one of the flange and the torque tube foot.

10. The torque tube assembly of claim 7, wherein the sacrificial member is disposed on the flange and extends in an axial direction at least partially between the flange and the torque tube foot.

11. The torque tube assembly of claim 10, further comprising:
 a channel defined by a channel wall and disposed in the flange, wherein the sacrificial member is at least partially disposed in the channel.

12. The torque tube assembly of claim 11, wherein the channel wall comprises an obtuse-angled edge.

13. The torque tube assembly of claim 11, wherein the channel wall comprises an acute-angled edge.

14. The torque tube assembly of claim 7, wherein the sacrificial member is disposed on the torque tube foot and extends in an axial direction at least partially between the torque tube foot and the flange.

15. A torque tube assembly comprising:
 a torque tube comprising a barrel portion disposed between a flange and a back leg, the back leg extending radially outward from the barrel portion, and a channel defined by a channel wall and disposed in an outer diameter of the barrel portion; and
 a sacrificial member disposed in the channel, wherein a friction face of the sacrificial member is in frictional contact with the channel, and
 wherein the channel wall comprises an obtuse-angled edge.

16. The torque tube assembly of claim 15, wherein the channel extends in an axial direction at least partially between the flange and the back leg.

17. The torque tube assembly of claim 15, further comprising:
 a first spline disposed on an outer diameter of the barrel portion; and
 a second spline disposed on the outer diameter of the barrel portion and substantially parallel to the first spline, wherein the channel extends in a radial direction at least partially between the first spline and the second spline.

18. A torque tube assembly comprising:
 a torque tube comprising a barrel portion disposed between a flange and a back leg, the back leg extending radially outward from the barrel portion, and a channel defined by a channel wall and disposed in an outer diameter of the barrel portion; and
 a sacrificial member disposed in the channel, wherein a friction face of the sacrificial member is in frictional contact with the channel, and
 wherein the channel wall comprises an acute-angled edge.

19. The torque tube assembly of claim 18, further comprising:
 a first spline disposed on an outer diameter of the barrel portion; and
 a second spline disposed on the outer diameter of the barrel portion and substantially parallel to the first spline, wherein the channel extends in a radial direction at least partially between the first spline and the second spline.

* * * * *